United States Patent [19]

Kondo

[11] 4,254,893
[45] * Mar. 10, 1981

[54] ARTICLE STORAGE UNIT DEVICES FOR USE IN VENDING MACHINES

[75] Inventor: Ryohei Kondo, Isesaki, Japan

[73] Assignee: Sankyo Electric Co., Ltd., Gunma, Japan

[*] Notice: The portion of the term of this patent subsequent to Nov. 28, 1995, has been disclaimed.

[21] Appl. No.: 940,865

[22] Filed: Sep. 8, 1978

Related U.S. Application Data

[63] Continuation of Ser. No. 715,825, Aug. 19, 1976, Pat. No. 4,127,218.

[30] Foreign Application Priority Data

Nov. 6, 1975 [JP] Japan .......................... 50/152062[U]
Feb. 17, 1976 [JP] Japan ................................ 51/15432
Mar. 22, 1976 [JP] Japan ........................... 51/32874[U]

[51] Int. Cl.² .......................................... B65G 59/10
[52] U.S. Cl. ................................... 221/124; 221/238
[58] Field of Search .............. 221/112, 114, 116, 124, 221/134, 237, 238, 242, 281, 297, 298; 312/35, 138 R

[56] References Cited

U.S. PATENT DOCUMENTS

| | | | |
|---|---|---|---|
| 1,139,711 | 5/1915 | Ogden | 221/298 |
| 1,944,499 | 1/1934 | Crimp | 221/115 |
| 2,816,719 | 12/1957 | Richert | 221/298 X |
| 2,993,623 | 7/1961 | Bendot | 221/298 |
| 3,095,114 | 6/1963 | Tobias | 221/114 |
| 3,145,066 | 8/1964 | O'Neal | 221/242 X |
| 3,215,241 | 11/1965 | Haefele et al. | 221/298 X |
| 3,837,528 | 9/1974 | Rakucewicz | 221/298 X |
| 3,871,059 | 3/1975 | Goldenstein | 221/242 X |

Primary Examiner—Robert J. Spar
Assistant Examiner—Fred A. Silverberg
Attorney, Agent, or Firm—Hopgood, Calimafde, Kalil, Blaustein and Lieberman

[57] ABSTRACT

An article storage unit device for use in a vending machine comprising a housing including a plurality of vertically extending article stacking spaces and a mechanism for discharging an article at one time. The device is characterized by an arrangement for reducing failure of article discharge and by another arrangement for readily loading or feeding fresh articles into the stacking spaces without any disassembling. The article discharging mechanism comprises a pendulous stopper plate disposed at the lower portion of each article stacking space and a control mechanism for projecting the stopper plate into the article stacking space to hold the article and for releasing the stopper plate to permit the article to fall down. An inner wall of the article stacking space opposite to the stopper plate is provided with a depression to prevent the article from being held by the inner wall and the upper article at a time when the stopper plate is released. Alternatively or additionally, the stopper plate may be so arranged that it is temporarily and rapidly moved during the releasing operation to provide a mechanical shock. Thus the article is securely discharged without failure. The housing has an open side end on which vertical extending bars are disposed along the vertical stacking spaces for preventing articles in the spaces from falling off through the open side end. The vertical bars are deflectable for loading or feeding articles into stacking spaces without disassembling.

9 Claims, 12 Drawing Figures

ARTICLE STORAGE UNIT DEVICES FOR USE IN VENDING MACHINES

This is a continuing application of copending application, Ser. No. 715,825, filed Aug. 19, 1976, now U.S. Pat. No. 4,127,218.

BACKGROUND OF THE INVENTION

This invention relates to vending machines and, in particular, to article storage unit devices used in the vending machines.

A vending machine has an article storage device, article discharge means for discharging one article at a time from the storage device, and article transporting means for transporting the discharged article to an access station, in a machine cabinet.

It is required in vending machines that a number of articles can be stored in the article storage device to decrease the number of times of article feeding, or loading, operation. However, the machines are desired to be small in the volume.

Moreover it is necessarily required that articles stored in the article storage device are securely discharged without failure.

Furthermore, it is required that fresh articles can be readily fed or loaded into the article storage device.

SUMMARY OF THE INVENTION

It is an object of this invention to provide an article storage unit device with article discharging means which is removably mounted in the vending machine and in which a number of articles can be stored. The unit device is provided with an arrangement for discharging article without failure.

It is another object of this invention to provide an article storage unit device having an arrangement for readily feeding fresh articles into the unit device.

It is yet another object of this invention to provide an article storage unit device with a simple construction.

According to this invention, an article storage unit device which is suitable for use in vending machines comprises a housing which has a front plate, a side plate, a rear plate and a bottom opening. The interior of the housing is partitioned by partition walls into a plurality of vertical extending spaces which are arranged along a horizontal direction from the front plate to the rear plate. In the vertically extending spaces articles are stored and stacked. The housing is provided with first plate means which is disposed along each of the vertically extending spaces at a position adjacent to the bottom opening on an opposite side of the side plate. The first plate means is rotatably supported at an upper end, and the lower end of the plate means is freely movable into and out of the corresponding vertically extending space. The first plate means is controlled by first control means to be pushed into the corresponding vertically extending space to hold the lowermost article of the stacked articles.

Thus, a number of articles are stored in the unit device as a plurality of article stacks. The articles are discharged by releasing the first plate means by the first control means.

The housing is also provided with second plate means which is disposed above the first plate means to hold an article adjacent to and above the lowermost article. The second plate means is also rotatably supported at an upper end, and a lower end of the second plate means is freely movable into and out of the corresponding vertically extending space. The second plate means is controlled by second control means to be pushed into the corresponding vertically extending space to hold the article adjacent to and above the lowermost article at a time when the first plate means is released.

The second control means releases the second plate means at a time when the first plate means is pushed into the corresponding vertically extending space. Thus, articles are discharged one at a time.

The side plate of the housing is provided with depressions in an inner surface thereof at positions against upper edges of lowermost articles stored in the vertically extending spaces. Thus, the lowermost article is discharged without failure upon the first plate means being released, because the lowermost article is not held, of clasped, by the inner surface of the side wall and the article adjacent to and above the lowermost article.

Each of the first and second control means may be cam means. The cam means may be provided with a stepped portion on a cam contour of the cam means to rapidly move corresponding one of the first and second plate means during releasing the corresponding one plate means. Thus mechanical shock is developed so that the lowermost article is securely discharged.

The housing has an open side end opposite to the side plate. On the open side end vertically extending bars are disposed along the vertically extending spaces, and are so supported that the upper ends of the bars are deflectable. Thus, fresh articles are readily fed into the vertically extending spaces without disassembling. The stored articles are prevented from falling off through the open side end.

Each of the vertically extending spaces may be formed rhombic in cross section by disposing each partition wall in inclined orientation to the side plate of the housing. So that articles having rhombic cross section may be stored in the unit device.

Further objects, features and aspects of this invention will be understood from following description of embodiments of this invention referring to annexed drawings.

DETAILED DESCRIPTION OF PREFERRED EMBODIMENTS

Figure 1:
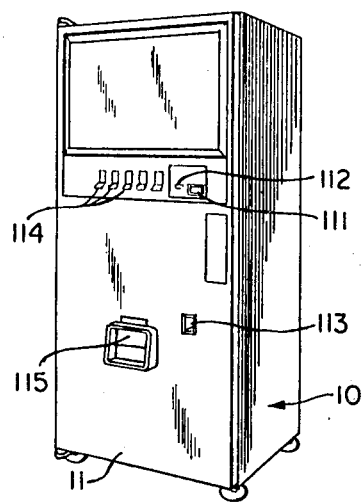
FIG. 1 shows a perspective view of a vending machine to which this invention is employed.
Figure 2:
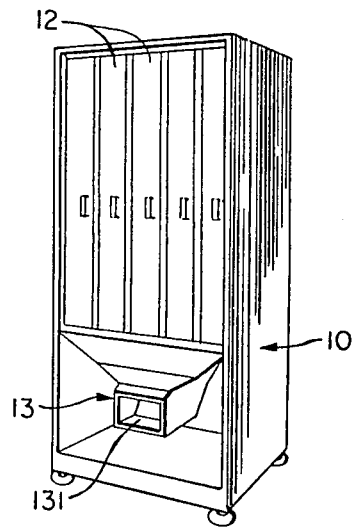
FIG. 2 shows a perspective view of a machine in FIG. 1, in which a front door is disassembled.

The article storage unit device of this invention is employed in a vending machine as shown in FIGS. 1 and 2.

Referring to FIG. 1, which shows a perspective view of a vending machine employing article storage unit devices of this invention, the shown vending machine comprises a machine cabinet 10 with a front door 11 which is hinged to the cabinet and selectively openable. The front door 11 is provided with a coin depositing opening 111, a manually operated lever 112 for returning deposited coin or coins, a coin returning opening 113 through which returned coins are obtained, article selecting buttons 114 (five buttons are shown) by which a desired kind of article is selected, and an access or delivery opening 115 through which a discharged article is obtained.

Referring to FIG. 2 which shows a perspective view of the machine cabinet 10 with the front door 11 being disassembled, in the cabinet 10, article storage unit devices 12 (five devices are shown) of this invention are mounted side by side. Under the unit devices 12, a downwardly sloping chute 13 is mounted, with a lower open end 131 thereof being matched to the access opening 115 of the front door.

The vending machine is preferred with coin mechanism, coin stoker and control circuits, but they are omitted for the simplification because this invention is not directed to them.

Each unit device 12 is slidably mounted in the cabinet 10 to be smoothly and easily drawn out.

Figure 3:
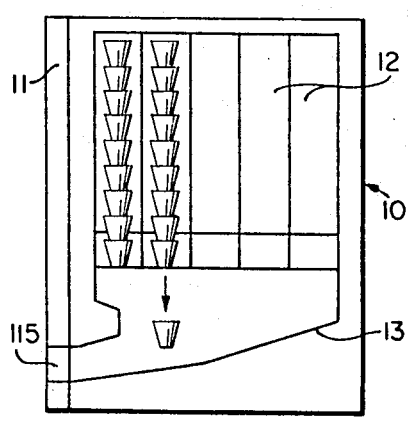
FIG. 3 shows a sectional view of the vending machine in FIGS. 1 and 2, schematically showing the discharge of articles.

Referring to FIGS. 1, 2 and 3, when a purchaser inserts coins through the coin depositing opening 111 and push an article selecting button 114, a corresponding unit device 12 discharges an article, as shown in FIG. 3, by the operation of control circuits (not shown) and the article discharge means. The discharged article is transported to the access station by common chute 13. Accordingly, the purchaser can obtain the desired article through the access opening 115.

Figure 4:
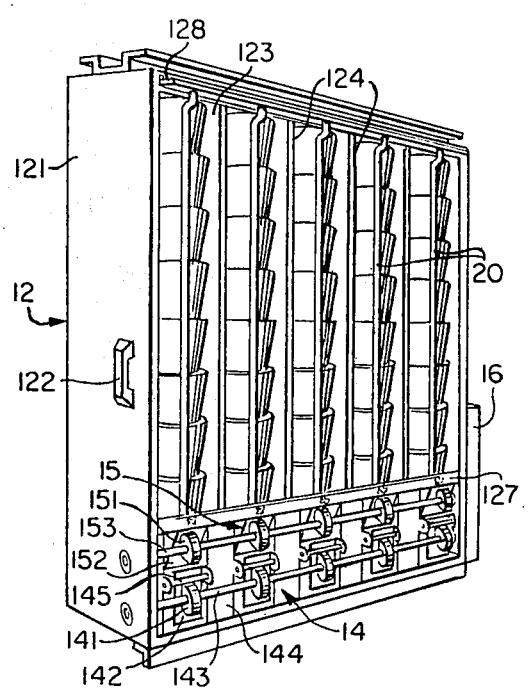
FIG. 4 shows a perspective view of an embodiment of this invention.

Referring to FIG. 4, which shows a perspective view of an embodiment of this invention, or the article storage unit device 12 in FIG. 2, the unit device comprises a housing 121 and a handle 122 fixed to a front plate of the housing. The housing 121 defines vertically extending spaces 123 partitioned by vertically extending partition walls 124. The vertical spaces (five spaces are shown) are arranged along a direction from the front end to the rear end of the unit device, and terminate at the lower end in a bottom opening (FIG. 5) which is provided in the bottom of the housing 121.

Stoppers 14 are provided to the housing 12 at lower portions of respective vertical spaces and adjacent to the bottom opening, each of which is for holding an article within the space at the position of the stopper. So that, a predetermined number of articles are stored in each vertical space with a vertical stack form.

The stopper 14 is arranged releasable for permitting the lowermost article in the stack to fall through the bottom opening in order to discharge articles from the unit device.

The housing 121 is also provided with additional stoppers 15, each of which is for holding an article adjacent to, and above, the lowermost article in each space 123.

Each additional or upper stopper 15 is operatively so connected with each corresponding lower stopper 14 that the holding operation of the former is effected only a time period when the latter is released.

As a result, from each article storing space 123, one article or the lowermost article is discharged at a time, and after discharge of the lowermost article, the remaining articles are lowered by an article hight so that a fresh article is held by the lower stopper 14.

Figure 5:
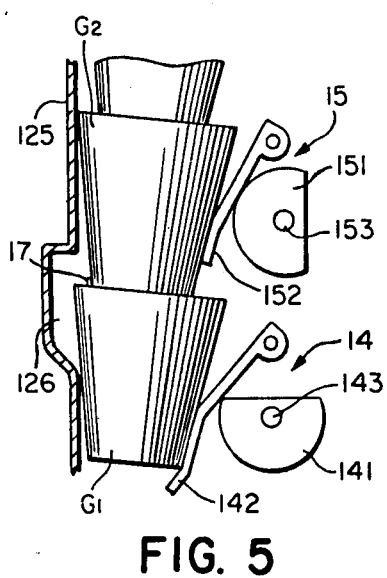
FIG. 5 shows a sectional view of the embodiment in FIG. 4.

Referring to FIGS. 4 and 5, in the shown embodiment, each of the lower stopper 14 comprises, in combination, a cam disk 141 and a stopper plate 142.

The cam disk 141 is mounted on a cam shaft 143 in such fashion that a circumference cam contour of the cam disk 141, faces the corresponding article storing space. The stopper plate 142 is pivotally mounted to frames 144 by a pin 145 and is freely pendent between the corresponding article storing space 123 and the cam disk 141 to engage with the cam disk. Therefore the stopper plate 142 serves as a cam follower of the cam disk 141.

The cam contour of the cam disk 141 is generally formed with a circular plane but is partially formed with a flat plane as shown in FIG. 5. Therefore, when the stopper plate 142 follows the circular portion of the cam contour, the stopper plate 142 protrudes into the article storing space 123 so that an article is held within the space at the position. On the other hand, when the stopper plate 142 follows the flat portion of the cam contour, the protrusion of the stopper plate 142 is reduced sufficiently to release the holding operation so that the article is permitted to fall through the bottom opening.

The upper stopper 15 similarly comprises, in combination, a cam disk 151 and a stopper plate 152, which are arranged similarly as the cam disk 141 and the stopper plate 142.

However, it should be noted that the upper cam disk 151 and the lower cam disk 141 are arranged different in the angular position of the rotation so that the upper stopper plate 152 protrudes into the article storing space 123 upon the lower stopper 14 being released, while the upper stopper plate 152 being restored from the protrusion after the lower stopper 14 again effecting the holding operation.

The cam shaft 143 of the lower cam disk 141 is rotated together with the rotation of a cam shaft 153 in a direction by a common driver or an electric motor 16. In the case, the flat portion of the cam contour of the lower cam disk 141 is arranged to be angularly prior to the flat portion of the cam contour of the upper cam disk 151.

Referring to FIG. 5, all of the lower stoppers 14 and all of the upper stoppers 15 are arranged similarly as above described arrangement. But it should be noted that all of the lower cam disks 141 are mounted on the common cam shaft 143 which is drived by the driver 16 and that all of the upper cam disks are mounted on the common cam shaft 153 which is also driven by the common driver 16.

Moreover, it should be noted that the flat portion of the cam contour of each one of lower cam disk 141 is arranged angularly different around the common cam shaft 143 from the other ones. Accordingly, similar angular differences are provided between each one of upper cam disks 151 and the other ones.

In the shown arrangement having five article storing spaces 123, the angular differences between the adjacent two cam disks is given by 360°/5=72°. Thus, if cam shafts are rotated by the angular distance of 72° by one operation of the common driver 16, one article is discharged from a first article storing space by a first operation of the driver 16, and an article is discharged from a second article storing space by a sequential second operation of the driver. When cam shafts are rotated over a complete revolution by five times operations of the driver 16, five articles have been discharged from the unit device 12.

This article storage unit device according to this invention is characterized in that the side plate 125 of the housing is provided with depressions 126 in an inner surface thereof at positions against upper edges of lowermost articles G1 in vertical extending spaces 123, as shown in FIG. 5.

Generally speaking, some articles sold by vending machines are usually wrapped by thin films, such as vinyl. A seam or seams of the wrapping thin film project on the top of the wrapped article. Such a projection is shown by 17.

If the inner surface of the side plate is flat, the lowermost article G1 may be held or clasped by the inner surface and the article G2 adjacent to and above the lowermost article, due to the engagement of the projection 17 with the lower edge of the upper article G2. So that the lowermost article G1 is not discharged even if the lower stopper plate 142 is released. This is undesirable for the vending machine. It will be noted that such an undesirable condition is caused by the existence of any other similar projections.

But in this embodiment, the lowermost article G1 is not clasped because of the provision of the depression 126. Even if the lowermost article G1 is subjected to a pressure to the side plate 125 due to the engagement of the projection 17 with the upper article G2, the lowermost article G1 is so inclined that the upper edge portion of the article comes into the depression 126, so that the lowermost article G1 is not clasped.

Thus, the lowermost article is discharged without failure when the lower stopper plate 142 is released.

Figure 6:
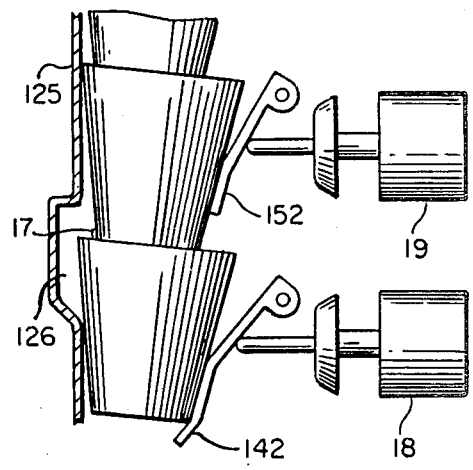
FIG. 6 shows a similar view of a modification as FIG. 5.

FIG. 6 shows a modification of the embodiment in FIGS. 4 and 5. The modification is characterized by the use of solenoid plungers 18 and 19 in place of cam disks 141 and 151 in FIGS. 4 and 5. It will be easily understood that stopper plates 142 and 152 are similarly controlled by controlling electric current fed to the solenoid plungers 18 and 19.

Referring to FIG. 4, the article storage unit device 12 is open on a side end opposite to the side plate 125. On the open side, vertically extending bars 20 are disposed along vertically extending spaces 123 to prevent articles in the spaces from falling off through the open side end.

On the open side end, lower and upper support members 127 and 128 are disposed horizontally extending between the front plate 121 and the rear plate.

Figure 7:
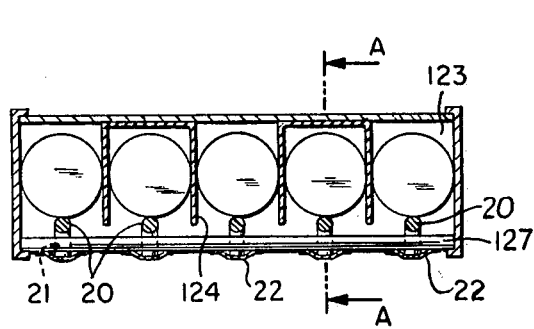
FIG. 7 shows a cross sectional view of the embodiment in FIG. 4.
Figure 8:
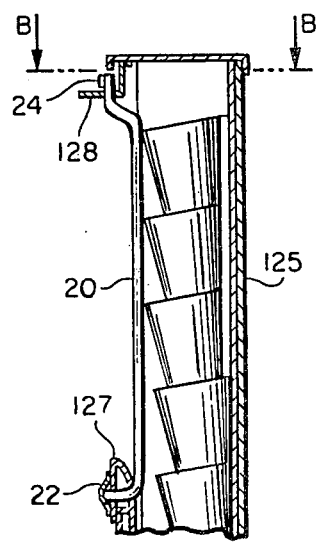
FIG. 8 shows a sectional view on line A—A in FIG. 7.

The lower support member 127 is for supporting lower ends of the bars 20. Referring to FIGS. 7 and 8, the lower support member 127 is provided with perforates 21 in which lower ends of bars 20 are inserted. The lower ends are prevented from falling out of the perforates 21 by means of bush nuts 22 or split pins.

Figure 9:
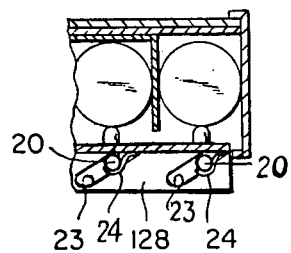
FIG. 9 shows a sectional view on line B—B in FIG. 8.

The upper support member 128 supports upper ends of bars 20. Referring to FIGS. 8 and 9, the upper support member 128 is provided with a plurality of horizontally extending angular slots 23. The upper ends of bars 20 are inserted into the slots 23 and are slidably supported. Therefore, bars 20 are deflectable within a limited extent.

The upper support member 128 is provided with retainers 24 for retaining upper ends of bars 20. The retainer is a resilient member, one end of which is fixed to the support member 128. The other free end portion is curved to partially project over the slot 23. The projecting portion engages with, and retains, the upper end of the bar 20. As clearly understood, the retainer 24 is releasable.

When the bar 20 is urged to be deflected, the upper end of the bar 20 is released from the retainer 24 and deflected along the slot 23. Thus fresh articles can be fed into the space 123.

After feeding articles, the upper end of the bar 20 is retained by urging the upper end to the retainer 24.

Figure 10:
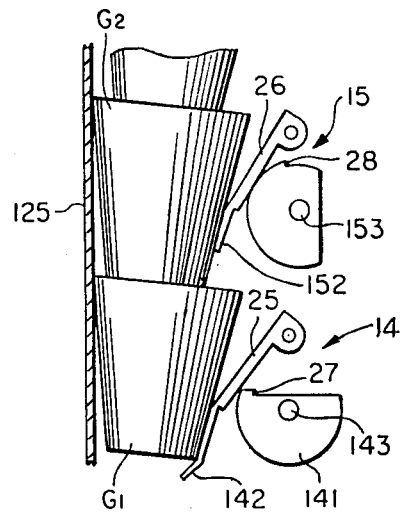
FIG. 10 shows another embodiment and is a similar view as FIG. 5.

Referring to FIG. 10, in which another embodiment of this invention is shown, the shown embodiment is similar as the above embodiment shown in FIGS. 4 and 5, except that the lower and upper stopper plates 142 and 152 are provided with cam follower projections 25 and 26 which project on the surfaces of the plates 142 and 152, lower and upper cam disks 141 and 151 being provided with stepped cam contour portions 27 and 28 and no depressions being formed in the inner surface of the side plate 125.

The stepped cam contour portion 27 is formed on the lower cam disk 141 at an angular position immediately before the lower stopper plate 142 is completely released to rapidly move the lower stopper plate 142 to a completely released condition at the end of the release operation carried out by the lower cam disk 141. Therefore the lowermost article G1 is subjected to a mechanical shock and is securely discharged even if the lowermost article is in condition that it partially engages with certain circumferencial members.

The stepped cam contour portion 28 on the upper cam disk 151 is formed at an angular position to hold the article G2 adjacent to and above the lowermost article G1 when the lower stopper plate 142 is released. Therefore, when the lower stopper plate 142 is released, the upper stopper plate 152 is also slightly moved towards its released position because the cam follower projection 26 follows the stepped cam contour portion 28. Thus, the article G2 is slightly but rapidly lowered. As a result, the article G2 pushes the lowermost article G1 downwardly to discharge the lowermost article G1 even if the lowermost article G1 is not still discharged.

Accordingly, in this embodiment the lowermost article G1 is discharged without failure.

In this embodiment depressions may be formed in the inner surface of the side plate 125, similarly as the embodiment shown in FIG. 5.

Furthermore, either one of lower and upper cam disks 141 and 142 is similarly formed as the embodiment in FIG. 5 or a cam disk without stepped cam contour portion. In such case, the corresponding stopper plate is not required to be provided with the cam follower projection.

Figure 11:
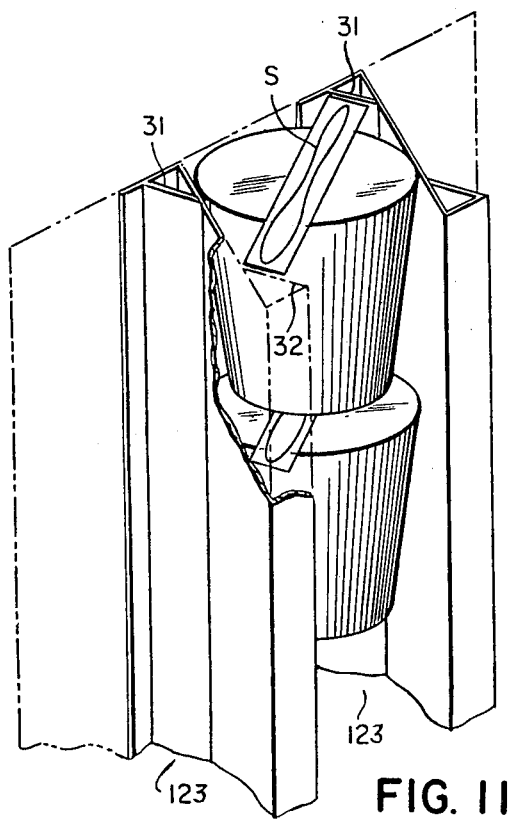
FIG. 11 shows a perspective view of a further embodiment, partially illustrating an article stacking space, FIG. 12 partially shows a sectional view of the embodiment in FIG. 11 with articles being stored.
Figure 12:
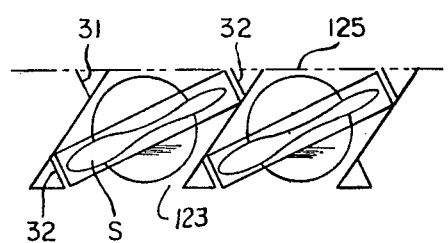

In above embodiments, the shape of the cross-section of each vertically extending space 123 is generally rectangular. But, if each partition wall is disposed to be inclined to the side plate 125, the space is rohmbic in the cross section as shown in FIGS. 11 and 12. In this embodiment, a spoon S is stored in the space 123 together with the articles, as shown in FIGS. 11 and 12. According to this embodiment, foods contained in cups can be sold together with spoons, folks or other means for eating the foods.

In the drawings, corner members 31, 32 are for guiding opposite ends of the elongated spoons S or other means and for reinforcing the partition walls.

This invention has been described in connection with specific embodiments, it will be understood to those skilled in the art that various modifications and other designations are easily made within the scope of this invention. What is claimed is:

1. An article storage unit device with means for discharging one article at a time for use in a vending machine, comprising;

a housing having a front plate, a side plate and a rear plate, and having a bottom opening, an interior of said housing being partitioned by partition walls into a plurality of vertically extending spaces which are arranged along a horizontal direction from the front plate to the rear plate, said vertically extending spaces being for storing and stacking articles therein, first plate means which is disposed along each of said vertically extending spaces at a position adjacent to said bottom opening on an opposite side of said side plate, said first plate means being rotatably supported at an upper end thereof with a lower end thereof being freely movable into and out of the corresponding vertical space, first cam means being so disposed that a peripheral cam contour of said first cam means directly engages with an outer surface of said first plate means, said first cam means pushing said first plate means into the corresponding vertical space at an angular position thereof to hold the lowermost article therein between said side plate and an inner surface of said first plate means and permitting said first plate means to move out of the corresponding vertical space at the other angular position, second plate means which is disposed above said first plate means and for holding an article adjacent to and above said lowermost article, said second plate means being rotatably supported at an upper end thereof with a lower end thereof being freely movable into and out of the corresponding vertical space, second cam means being so disposed that a peripheral cam contour of said second cam means directly engages with an outer surface of said second plate means, said second cam means pushing said second plate means into the corresponding vertical space at an angular position thereof to hold the article adjacent to and above the lowermost article between said side plate and an inner surface of said second plate means and permitting said second plate means to move out of the corresponding vertical space at the other angular position, and said second cam means being in a different angular relation with said first cam means so that said second cam means is at the pushing angular position when said first cam means is at the other angular position, and said side plate being provided with depressions in an inner surface thereof at positions against upper edges of lowermost articles in said vertical spaces.

2. The article storage unit device as claimed in claim 1, which further comprises said housing having an open side opposite to said side plate, a plurality of elongated bars which are disposed on said open side of said housing vertically extending along said vertical spaces, respectively, a lower support member for supporting lower ends of said elongated bars and being disposed on said open side of said housing horizontally extending between said front plate and said rear plate, and an upper support member for supporting upper ends of said bars and being mounted on said open side of said housing horizontally extending between said front plate and said rear plate, said upper support member being provided with means for retaining the upper ends of said bars and being releasable to permit the upper ends of said bars to deflect so that articles are able to be inserted into said vertical spaces without disassembling said bars.

3. The article storage unit device as claimed in claim 2, wherein said upper support member is formed with a plurality of horizontally extending slots into which the upper ends of said plurality of bars are slidably inserted whereby the deflection of said bars is guided and limited within a predetermined distance.

4. The article storage unit device as claimed in claim 3, wherein said retaining means are resilient members, one end portion of each is fixed to said upper support member, the other free end portion being so curved to partially project over corresponding one of said slot, said projecting portion resiliently releasably retaining the upper end of the corresponding one of said bars in cooperation with the corresponding slot.

5. The article storage unit device as claimed in claim 1, wherein said partition walls are disposed inclined to said side plate so that said storing spaces are formed rhombic in the cross-section thereof.

6. The article storage unit device as claimed in claim 1, wherein at least one of said first and second plate means is provided with a cam follower surface projecting on the outer surface thereof facing the corresponding cam means, said the corresponding cam means being provided with a stepped portion on a transition region of a cam contour thereof from said pushing angular position to said the other angular position in the rotating direction of the cam means so that said at least one of said first and second plate means is rapidly moved to develop a mechanical shock when said cam follower projecting surface follows said stepped portion.

7. An article storage unit device with means for discharging one article at a time for use in a vending machine, comprising:

a housing having a front plate, a side plate and a rear plate, and having a bottom opening, an interior of said housing being partitioned by partition walls into a plurality of vertically extending spaces which are arranged along a horizontal direction from the front plate to the rear plate, said vertically extending spaces being for storing and stacking articles therein, first plate means which is disposed along each of said vertically extending spaces at a position adjacent to said bottom opening on an opposite side of said side plate, said first plate means being rotatably supported at an upper end thereof, with a lower end thereof being freely movable into and out of the corresponding vertical spaces, first cam means being so disposed that a peripheral cam contour of said first cam means directly engages with an outer surface of said first plate means, and for pushing said first plate means into the corresponding vertical space at an angular position of the rotation thereof to hold the lowermost article therein between said side plate and an inner surface of said first plate means and permitting said first plate means to move out of the corresponding vertical space at the other angular position to release the lowermost article, second plate means which is disposed above said first plate means and for holding an article adjacent to and above the lowermost article, said second plate means being rotatably supported at an upper end thereof, with a lower end thereof being freely movable into and out of the corresponding vertical space, second cam means being so disposed that a peripheral cam contour of said second cam means directly engages with an outer surface of said second plate means, and for pushing said second plate means into the corresponding vertical space at an angular position of the rotation thereof to hold the article adjacent to and above the lowermost article between said side plate and an inner surface of said second plate means and permitting said second plate means to move out of the corresponding vertical space at the other angular position to release the article adjacent to and above the lowermost article, said second cam means being in such a different angular relation with said first cam means that said second cam means is at the pushing angular position when said first cam means is at the other angular position, and cam follower projecting surface which is provided with at least one of said first and second plate means and projects on the outer surface of said at least one plate means facing the corresponding cam means, said the corresponding cam means being provided with a stepped portion on a transition region of a cam contour thereof from said pushing angular position to said the other angular position in the rotating direction of the cam means, whereby said at least one of said first and second plate means is rapidly moved to develop a mechanical shock when said cam follower projecting surface follows said stepped portion.

8. The article storage unit device as claimed in claim 7, which further comprises said housing having an open side opposite to said side plate, a plurality of elongated bars which are disposed on said open side of said housing vertically extending along said vertical spaces, respectively, a lower support member for supporting lower ends of said elongated bars and being disposed on said open side of said housing horizontally extending between said front plate and said rear plate, and an upper support member for supporting upper ends of said bars and being mounted on said open side of said housing horizontally extending between said front plate and said rear plate, said upper support member being provided with means for retaining the upper ends of said bars and being releasable to permit the upper ends of said bars to deflect so that articles are able to be inserted into said vertical spaces without disassembling said bars, and said upper support member being formed with a plurality of horizontally extending slots into which upper ends of said a plurality of bars are inserted whereby the deflection of said bars is guided and limited within a predetermined distance.

9. The article storage unit device as claimed in claim 7, wherein said partition walls are disposed inclined to said side plate so that said vertical spaces are formed rhombic in the cross section thereof.

* * * * *